United States Patent [19]

Tienor

[11] 4,152,974
[45] May 8, 1979

[54] HOT AIR CORN POPPER

[75] Inventor: Lawrence J. Tienor, Eau Claire, Wis.

[73] Assignee: National Presto Industries, Inc., Eau Claire, Wis.

[21] Appl. No.: 916,128

[22] Filed: Jun. 16, 1978

[51] Int. Cl.² ............................................. A23L 1/18
[52] U.S. Cl. ................................... 99/323.8; 99/323.9
[58] Field of Search ............... 99/323.5, 323.8, 323.11, 99/323.4, 323.6, 323.7; 426/450

[56] References Cited

U.S. PATENT DOCUMENTS

| 904,186 | 11/1908 | Eckstein | 99/323.11 |
|---|---|---|---|
| 1,364,430 | 1/1921 | Freeburger | 99/323.8 |
| 1,436,400 | 11/1922 | Mabey | 99/323.8 |
| 1,457,854 | 6/1923 | Parks | 99/323.5 |
| 1,648,005 | 11/1927 | Pritchard | 99/323.5 |
| 2,241,938 | 5/1941 | Wilsey | 99/326.6 |
| 2,421,902 | 6/1947 | Neuschotz | 263/21 |
| 2,458,190 | 1/1949 | Newburger | 219/19 |
| 2,590,580 | 3/1952 | Schiavone | 219/47 |
| 2,602,134 | 7/1952 | Nelson | 219/47 |
| 2,603,142 | 7/1952 | Miller | 99/323.8 |
| 2,657,627 | 11/1953 | Lindstrom | 99/323.6 |
| 2,670,292 | 2/1954 | Emerson | 99/323.7 |
| 2,674,936 | 4/1954 | Martin | 99/323.7 |
| 2,742,848 | 4/1956 | Case | 99/323.7 |
| 2,743,663 | 5/1956 | Bruntsen | 99/323.7 |
| 2,771,836 | 11/1956 | Denehie | 99/323.8 |
| 2,848,937 | 8/1958 | Martin | 99/323.7 |
| 2,856,841 | 10/1958 | Cretors | 99/238 |
| 2,858,761 | 11/1958 | Denniss | 99/238.7 |
| 2,907,264 | 10/1959 | Bushway | 99/238.3 |
| 2,922,355 | 1/1960 | Green | 99/323.11 |
| 3,059,567 | 10/1962 | Lindemann | 99/323.11 |
| 3,120,168 | 2/1964 | Lippert | 99/238.3 |
| 3,180,247 | 4/1965 | Hill | 99/323.8 |
| 3,209,672 | 10/1965 | Baunach | 99/323.7 |
| 3,253,532 | 5/1966 | Jones | 99/238.3 |
| 3,254,800 | 6/1966 | Baunach | 222/132 |
| 3,294,546 | 12/1966 | Fingerhut | 99/323.7 |
| 3,323,440 | 6/1967 | Grant | 99/323.5 |
| 3,392,661 | 7/1968 | Hanser | 99/323.5 |
| 3,450,539 | 6/1969 | Goode | 99/238.3 |
| 3,554,115 | 1/1971 | Mankey | 99/238.3 |
| 3,570,388 | 3/1971 | Gottlieb | 99/323.5 |
| 3,606,828 | 9/1971 | Smith | 99/323.9 |
| 3,641,916 | 2/1972 | McDevitt | 99/238.3 |
| 3,665,839 | 5/1972 | Gottlieb | 99/323.5 |
| 3,697,289 | 10/1972 | Day | 99/323.8 |
| 3,756,139 | 9/1973 | Wolens | 99/323.5 |
| 3,812,774 | 5/1974 | Day | 99/323.8 |
| 3,845,701 | 11/1974 | Sachnik | 99/323.5 |
| 3,886,855 | 6/1975 | Nara | 99/323.11 |
| 3,931,757 | 1/1976 | Goode | 99/323.11 |
| 4,072,091 | 2/1978 | Richardson | 99/323.5 |

OTHER PUBLICATIONS

"The Popcorn Pumper", Retailing Home Furnishings, Dec. 19, 1977.
Wear-Ever Brochure, 110-620.

Primary Examiner—Robert W. Jenkins
Attorney, Agent, or Firm—Merchant, Gould, Smith, Edell, Welter & Schmidt

[57] ABSTRACT

A hot air corn popper comprises a body having a lower body portion closed by a removable cover. A hollow stainless steel popping vessel is removably held in the lower body portion and has a bottom end closed by a perforated grill. A gravity flow feed hopper formed in the lower body portion provides an automatic flow of unpopped kernels into the popping vessel where they are contained on top of the grill. An upwardly directed hot air flow produced in the lower body portion is directed through the popping vessel. The air flow pops the unpopped kernels and carries the popped kernels out of the popping vessel and the body to a storage receptacle.

20 Claims, 10 Drawing Figures

U.S. Patent  May 8, 1979  Sheet 3 of 3  4,152,974
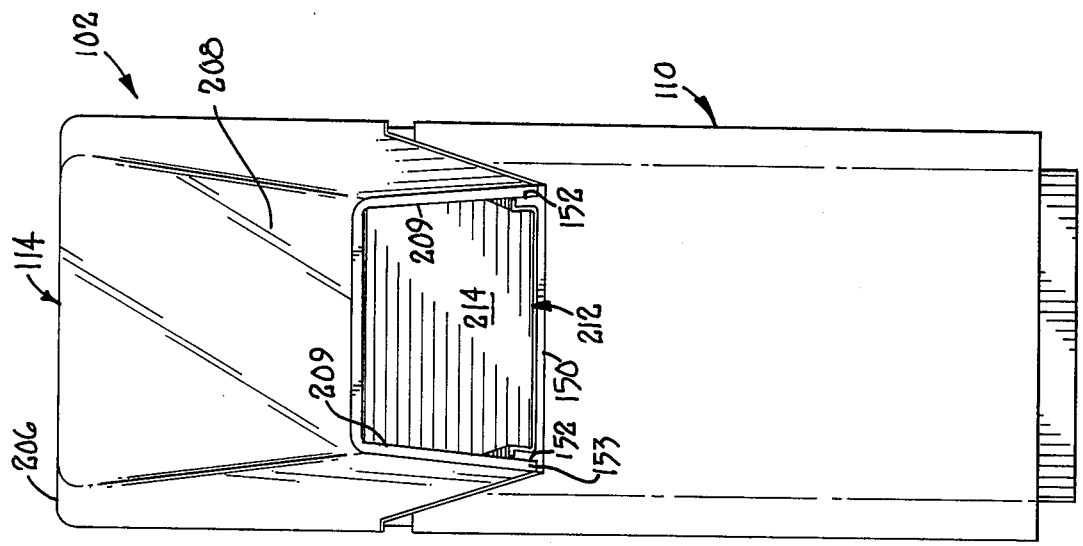
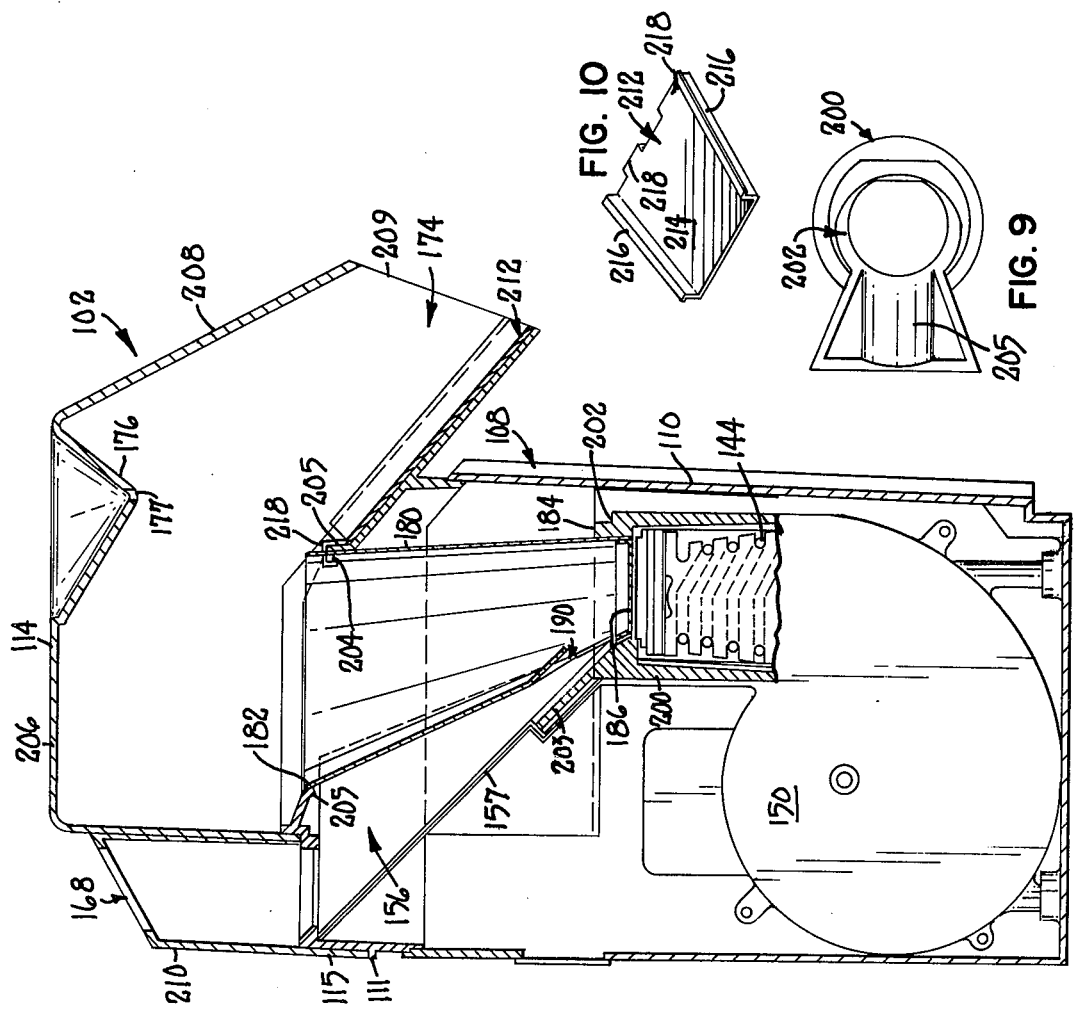

HOT AIR CORN POPPER

BACKGROUND OF THE INVENTION

1. Field of the Invention

This invention relates to an apparatus for popping kernels of corn. More particularly, this invention relates to a corn popping apparatus or device which utilizes a stream of hot air as the popping medium.

2. Description of the Prior Art

Popcorn is a product which generically refers to the popped or expanded kernels of various hybrids of corn. Many devices have been utilized over the years for popping corn. Such devices generally fall into one of two categories:

(1) poppers which might be referred to as "wet" poppers which utilize a liquid cooking oil or agent as the popping medium, (2) poppers which might be referred to as "dry" poppers which utilize a stream of hot air as the popping medium.

Corn poppers which utilize a stream of hot air as the popping medium have a number of advantages over wet poppers. For one thing, a hot air corn popper does not use any cooking oil or the like thereby eliminating one of the expenses of operating a wet popper. In addition, corn popped in a dry popper will be less caloric than corn popped in a wet popper because of the lack of the cooking oil. In addition, hot air poppers often will pop the corn much faster than a wet popper. Moreover, such dry poppers leave virtually no unpopped kernels of the type commonly referred to as old maids.

Many types of hot air corn poppers have been used in the past. The following patents are a representative sample of some of these hot air corn poppers. U.S. Pat. Nos. 1,648,005 to Pritchard, 2,922,355 to Green, 3,294,546 to Fingerhut, 3,323,440 to Grant, and 3,665,839 to Gottlieb.

Some of the popping devices defined by the above patents utilize quite complex structures for popping the corn. One of the problems associated with these devices is the problem of feeding unpopped kernels into the popper. Generally, this feeding is accomplished intermittently such that separate and distinct charges or batches of unpopped kernels enter the popping device. Some of the above patents do disclose an automatic and continuous kernel feeding mechanism, most notably the patents to Green and Fingerhut. However, this automatic feeding mechanism comprises a motorized auger type conveyor. Such a mechanism is quite complicated and prone to mechanical breakdowns. Generally, the complexity of the popping devices disclosed in these patents render the devices uneconomical from the standpoint of consumer use in the home.

SUMMARY OF THE INVENTION

One aspect of this invention is to provide a hot air corn popping apparatus which is simple, efficient, and quite suited for home consumer use.

This invention relates to a hot air corn popping apparatus suited for home use which comprises a body. The body includes a means for producing an upwardly directed stream or flow of hot air. A movable popping vessel having an open top end and a lower end closed by a perforated screen is positioned in the path of the upwardly directed air stream. The popping vessel has an inlet opening positioned adjacent the screen which is operatively associated with a gravity flow feed hopper. The gravity flow feed hopper contains a supply of unpopped kernels which flow by gravity through the inlet opening onto the screen of the popping vessel. The upper edge of the inlet opening serves to limit and control the depth of unpopped kernels on the screen. As the hot air stream passes through the popping vessel, it serves to agitate the corn kernels. The coaction of the hot air stream with a slanted front wall of the popping vessel also induces a rearward circular motion in the kernels. This motion tends to keep unpopped kernels contained within the popping vessel. The hot air eventually heats and pops the unpopped kernels. These kernels expand as they pop which decreases their density and allows the hot air stream to carry the kernels out of the popping vessel.

BRIEF DESCRIPTION OF THE DRAWINGS

The present invention will be described hereafter in the following Detailed Description, when taken in conjunction with the following drawings, in which like reference numerals will refer to like elements throughout the several views.

FIG. 7 is a cross-sectional, side elevational view similar to FIG. 1 of a second embodiment of a hot air corn popper according to this invention;

FIG. 8 is a front elevational view of the hot air corn popper shown in FIG. 7;

FIG. 9 is a top view of an insulating sleeve which forms a portion of the hot air corn popper of FIG. 7; and FIG. 10 is a perspective view of an aluminum slide for use in the hot air corn popper of FIG. 7.

DETAILED DESCRIPTION

Figure 1:
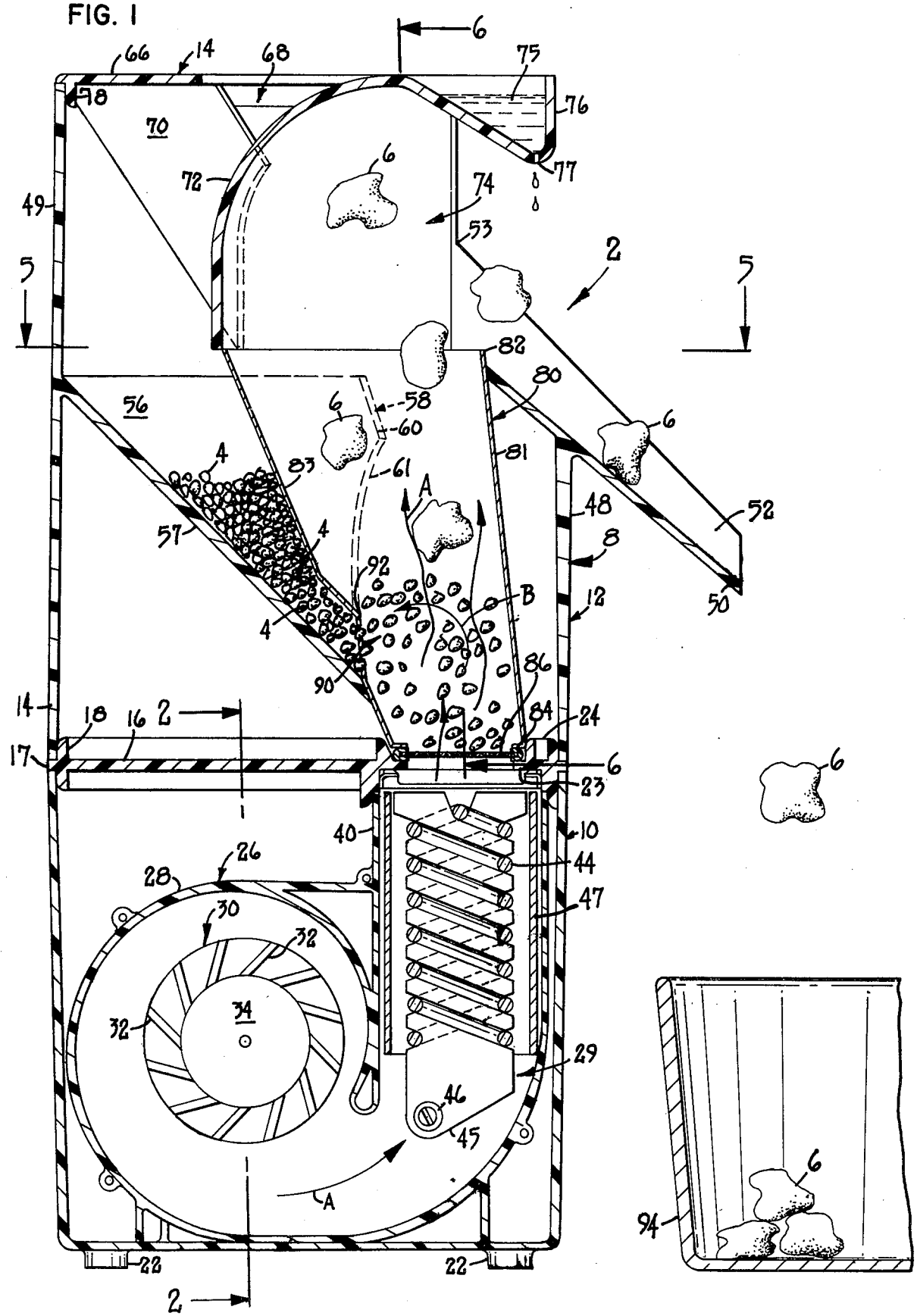
FIG. 1 is a cross-sectional, side elevational view taken through the center line of a first embodiment of a hot air corn popper according to this invention.

Referring now to FIG. 1, an improved corn popper according to the present invention is generally indicated as 2. Corn popper 2 is particularly suited for consumer use in the home in popping unpopped corn kernels 4. Corn kernels 4 when heated to a sufficient temperature suddenly expand or "pop" converting the relatively small dense kernel 4 into a white starchy mass having a significantly lower density. The popped kernels of corn are indicated as 6.

Figure 2:
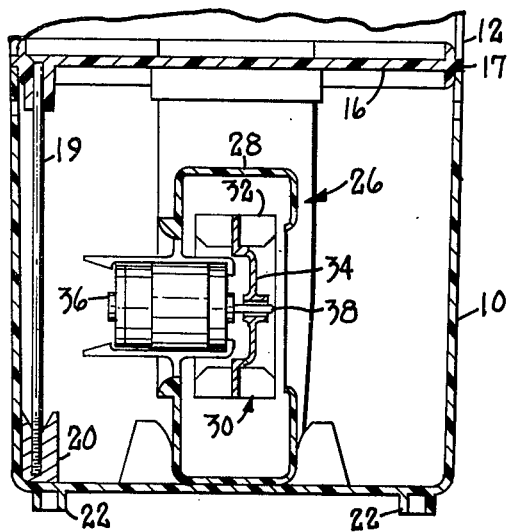
FIG. 2 is a partial cross-sectional view taken along the lines 2—2 of FIG. 1.
Figure 3:
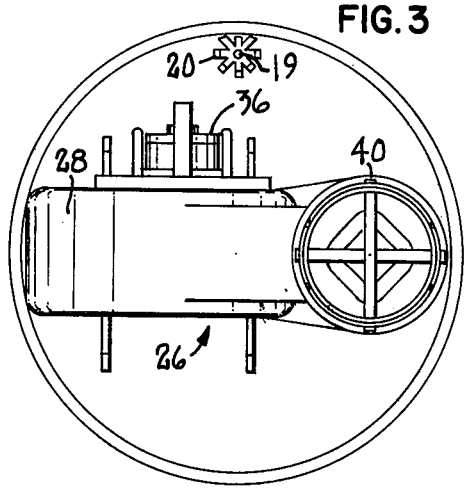
FIG. 3 is a bottom plan view with the floor removed of the hot air corn popper shown in FIG. 1.

Corn popper 2 includes a vertically elongated hollow body generally indicated as 8. Body 8 includes a substantially circular base section 10, an oval or circular popping section 12 located above base section 10, and an upper removable lid or cover 14. A transversely exending horizontal wall 16 is located between base section 10 and popping section 12. As shown in FIGS. 1 and 2, horizontal wall 16 includes an annular outwardly extending lip or flange 17 defined by and located adjacent to a vertically extending wall 18. The walls of popping section 12 are adapted to engage lip 17 and wall 18 in a tight fit so that horizontal wall 16 may be press fit into the bottom of popping section 12 as shown in FIG. 1. If desired, horizontal wall 16 could also be fixedly attached, as by any suitable bonding adhesive or the like, to the bottom end of popping section 12. Popping section 12 is then fixedly mounted on top of base section 10 by longitudinally extending bolts or screws 19. Bolts 19 pass downwardly through countersunk holes in horizontal wall 16 and engage suitable threaded brackets 20 located on the bottom wall of base section 10. Although only one such bolt 19 is shown in FIGS. 2 and 3, a plurality of such bolts spaced around the periphery of wall 16 are preferably used. Horizontal wall 16 has a substantially circular opening 24 located adjacent one side thereof to allow communication between popping section 12 and base section 10. Opening 24 contains an inwardly protruding support lip 23. Together base section 10, popping section 12 and wall 16 may be said to define a lower body portion or member.

Base section 10 has a plurality of downwardly projecting feet 22 which support body 8 in an upright manner on any planar surface. Base section 10 also includes a hollow housing 26 which is generally fixedly attached inside base section 10. Housing 26 includes a first arcuate section 28 which defines a blower housing. Mounted within blower housing 28 is a generally conventional blower assembly 30. Blower assembly 30 comprises a plurality of radially slanted vanes 32 mounted on a central hub 34. A conventional electric motor 36 or the like has its output shaft 38 releasably coupled to hub 34. Electric motor 36 is preferably of a type which may be actuated by 12.5 Volts D.C., which voltage is derived from normal household voltage, i.e. 110 Volts A.C. by a converter (not shown). Although an electric motor 36 is preferred, any suitable motor can be used. Rotation of the motor output shaft 38 will rotate the blower vanes 32 inside blower housing 28. This causes an air flow in the direction generally indicated by the arrow A.

Housing 26 further includes a vertically extending circular heater housing section 40. Heater housing 40 has one end aligned with an outlet opening 29 of blower housing 28 and extends between the blower housing 28 and the circular opening 24 in wall 16. An electrical heater of the open coil type having a resistance wire element is generally indicated as 44. Resistance heater 44 is fixedly located in heater housing 40 by means of a mounting screw 46 or the like which passes through a support plate 45 on which coil heater 44 is mounted. Heater 44 will be actuated substantially simultaneously with the actuation of blower 30 to heat the air passing upwardly through heater housing 40. This air stream is heated to a temperature in the range necessary to pop corn kernels 4, e.g. to approximately 450°–475° F. Together, blower 30 and resistance heater 44 constitute a means for producing an upwardly directed flow or stream of hot air in body 8. Although use of an electrical resistance heater 44 is preferred, any suitable heating mechanism or medium could be used. An insulating sleeve 47 is fixedly located or integrally made a part of heater housing 40. Insulating sleeve 47 surrounds heater 44.

Figure 5:
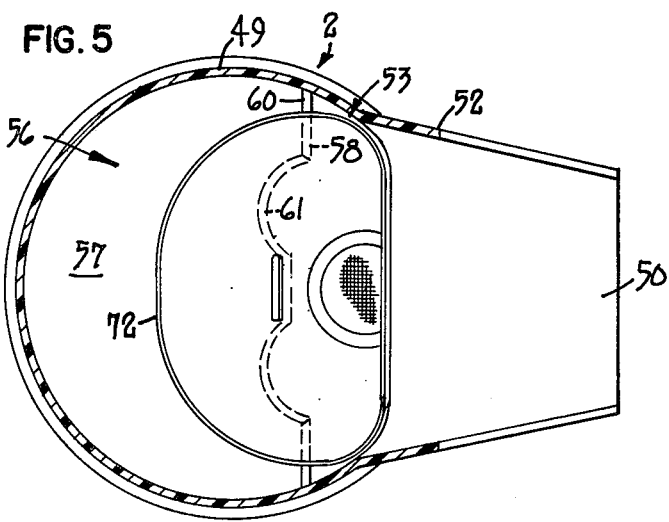
FIG. 5 is a cross-sectional view of the hot air corn popper shown in FIG. 1, taken along lines 5—5 of FIG. 1.

Referring now more particularly to popping section 12 of body 8, popping section 12 is superimposed on top of base section 10 as described previously. Popping section 12 has a substantially oval or circular cross-sectional shape as shown generally in FIG. 5. The front wall 48 of popping section 12 is shorter than the rear wall 49 thereof and has an outwardly extending inclined plane or chute 50. Chute 50 has two upwardly extending side flanges 52 between which the popped corn 6 will pass as shown in FIG. 1. Side flanges 52 blend into the arcuate rear wall 49 of the popping section 12 at their inner end as indicated at 53 in FIG. 5.

Figure 6:
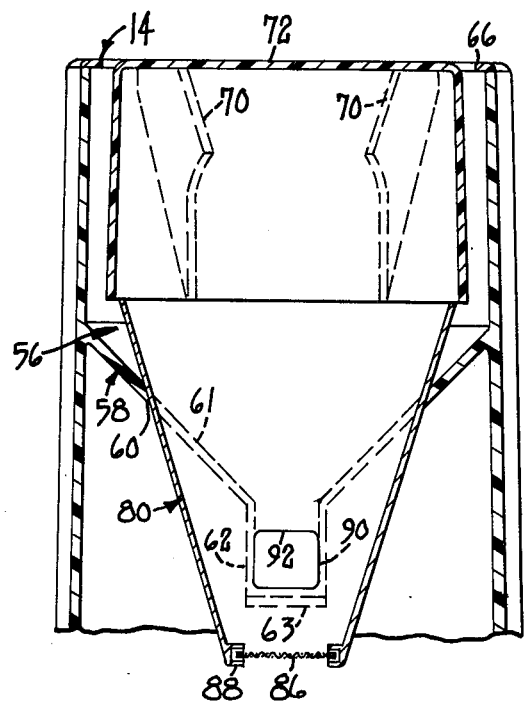
FIG. 6 is a cross-sectional view of the hot air corn popper shown in FIG. 1, taken along the lines 6—6 of FIG. 1.

Popping section 12 also has an arcuate semi-circular chamber generally indicated as 56 which functions as a corn holding chamber and gravity flow feed hopper. A downwardly inclined surface 57 is integrally attached to the rear wall 49 of the popping section at approximately the midpoint thereof. Inclined surface 57 extends around a majority of the periphery of popping section 12. Inclined surface 57 terminates in two forwardly, vertically slanted walls 58. (FIGS. 5 and 6) Each wall 58 comprises a substantially planar edge 60, a curved or arcuate edge 61, and a vertical edge 62. The vertical edges 62 of each wall 58 extend downwardly a short distance and are joined together by a horizontal surface 63. The purpose of walls 58 and surface 57 will be described hereafter.

Figure 4:
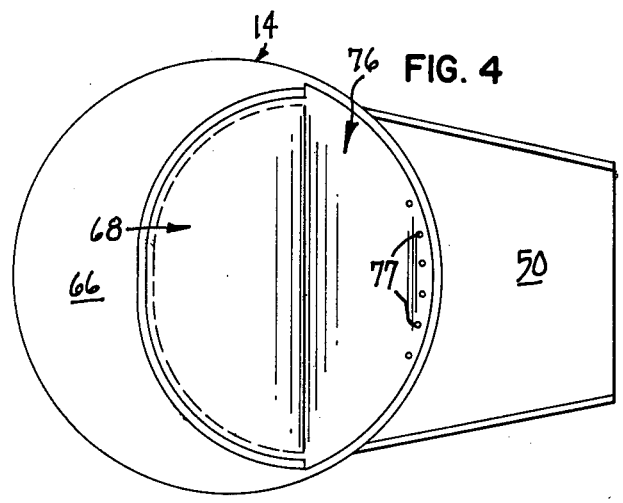
FIG. 4 is a top plan view of the corn popper of FIG. 1, with the upper lid or cover thereof shown in place.

Turning now to a description of cover or lid 14 and referring to FIGS. 1 and 4, cover 14 comprises a substantially crescent-shaped top plate 66 which surrounds a generally semi-circular access slot 68. Two downwardly projecting spaced reinforcing walls 70 extend between the top plate 66 and an arcuate, semi-hemispherical deflector member 72. Deflector member 72 curves upwardly beneath and into the access opening 68 (FIG. 1) to form a popped corn receiving chamber and means for directing the popped corn 6 out through an outlet opening 74. Outlet opening 74 is defined by the open space between the front edge of cover 14 and inclined chute 50. The front portion of curved deflector 72 has an upwardly facing recess which defines a butter container 76. Container 76 has a plurality of drain holes 77 located at the lowest point of container 76. Drain holes 77 are located above chute 50. Container 76 is designed to hold a popcorn coating agent 75 such as butter, margarine or any suitable butter substitute. This coating agent 75 will be applied by container 76 to the popped corn 6 in a manner to be described hereafter. In addition, cover 14 has a downwardly depending annular flange 78 around the periphery of top plate 66. Flange 78 abuts against the upper edge of the popping section 12 to releasably couple cover 14 to the remainder of body 8.

Corn popper 2 further includes a stainless steel popping vessel generally indicated as 80. Popping vessel 80 is in the form of an oval truncated cone having an open upper end 82 and a lower end 84. Lower end 84 has a perforated grill or screen 86 therein. Grill 86 is fixedly connected to lower edge 84 by an annular U-shaped flange 88. The rear wall 83 of popping vessel 80 has an inlet opening 90. Opening 90 has a horizontal upper edge 92.

Popping vessel 80 has a rearwardly slanted front wall 81 and a slanted rear wall 83. In addition, popping vessel 80 is meant to be releasably contained inside body 8 with its lower end 84 disposed in the opening 24 in wall 16 on top of lip 23. When so disposed, wall 83 rests against the inclined surface 57. In this regard, the arcuate edges 62 of the walls 58 conform to the angular configuration of rear wall 83 as the popping vessel 80 rests against the walls 58. Moreover, when cover 14 is held on top of the popping section 12, the cover 14 has the corn deflector member 72 positioned closely adjacent and surrounding the upper edge 82 of the popping vessel 80 as shown in FIG. 1. Furthermore, a bowl or other suitable storage receptacle 94 is positioned outside the body 8 generally vertically beneath the end of chute 50.

Referring now to the operation of corn popper 2 and assuming that all of the components thereof are placed in an assembled position as shown in FIG. 1, the operator initially fills corn popper 2 with unpopped corn kernels 4. This occurs by pouring the corn kernels 4 through the access opening 68 between the walls 70 and down into hopper 56. Corn kernels 4 will thus be contained in the reservoir of hopper 56 which is located between the inclined surface 57 and the rear wall 83 of popping vessel 80. A large number of corn kernels 4 are preferably located in gravity flow feed hopper 56 for assuring a constant and automatic feed of the corn kernels 4 into popping vessel 80 through inlet opening 90.

Once the popper 2 has been filled, the corn kernels 4 will feed automatically through inlet opening 90 into the popping vessel 80 where they will be located on top of grill 86. The upper edge 92 of inlet opening 90 automatically limits and assures a constant depth of corn kernels 4 on grill 86 assuming hopper 56 is kept filled above the level of inlet opening 90. In any event, once the blower 30 and heater 40 are actuated, an upwardly directed flow of hot air will pass through grill 86 and into the corn kernels 4. Because of the rearward slant of front wall 81, the upwardly directed flow of hot air coacts with wall 81 to induce in corn kernels 4 a circular rotating motion towards the rear wall 83 of the popping vessel 80. This circular motion is indicated by the arrow B.

Once the corn kernels 4 are sufficiently heated by popping vessel 80, they "pop", i.e. explosively expand into popped kernels 6. These popped kernels 6 have a density which is sufficiently less than the density of unpopped kernels 4 that the air flow is able to carry the popped kernels 6 up out of the popping vessel past the upper edge 82 thereof. The deflector member 72 guides and deflects the popped kernels 6 out through the outlet opening 74 where they then slide down inclined chute 50. In this regard, the flow of hot air passing up through corn popper 2 will heat container 76 which is part of cover 14. This causes the coating agent 75 contained therein, i.e. butter or a butter substitute, to melt and drip downwardly through drain holes 77. This downward flow of the melted coating agent will cover or coat the chute 50 with the coating agent. This coating agent then contacts and covers the popped kernels 6 as they slide down chute 50. In addition, some of the melted coating agent will drip directly down onto the popped kernels 6 as they slide down chute 50. In any event, the melted coating agent flow from container 76 is sufficient to adequately coat kernels 6 with butter or any suitable butter substitute.

Corn popper 2 according to this invention has a number of advantages. First, it does not utilize any cooking or vegetable oil but rather utilizes a hot air flow as the corn popping medium. Thus, corn popper 2 is cheaper to operate than prior art corn poppers because the consumer need not use a cooking oil. In addition, because corn kernels 4 have been popped without using any cooking oil, such kernels will not contain any oil entrained therein. These kernels will thus be less caloric than if they had been popped using a cooking oil. Corn popped in corn popper 2 can comprise a dietetic food product. In addition, corn popper 2 can pop kernels 4 much more quickly than in those methods which utilize a cooking oil.

In addition, the provision of a grill or screen 86 is advantageous for a number of reasons. First, such a grill is necessary to prevent the corn kernels 4 from dropping downwardly into the heating mechanism 44 before they are popped. Secondly, grill 86 ensures that corn popper 2 can be turned off at any time. Grill 86 will then retain any unpopped kernels 4 which have already been loaded into popper 2 in a ready state for continued popping upon reactivation of the popper 2. However, it is not preferred that corn popper 2 be shut off with kernels 4 still present in grill 86 since the retained heat of the grill tends to scorch these kernels.

Moreover, the gravity flow feed hopper 56 ensures a constant flow of corn kernels into the popping area in popping vessel 80 as long as a sufficient supply of kernels 4 are present in hopper 56. Thus, an operator can load a relatively large number of kernels 4 into hopper 56 and have the corn popper 2 pop continuously until all such kernels 4 are gone. Corn popper 2 can be kept in a continuous popping mode by periodically refilling hopper 56 before the supply kernels 4 therein is completely depleted. Furthermore, inlet opening 90 of popping vessel 80 and the manner in which it cooperates with gravity flow feed hopper 56 ensures a constant depth of kernels in the popping area on top of grill 86. This depth is chosen to maximize the popping ability of popper 2 and ensure a quick, complete and even popping kernels 4. Popping of kernels 4 will usually commence within 45 seconds to one minute after blower 30 and heater 44 are activated.

The rearward rotation induced in corn kernels 4 as illustrated by arrow B is also particularly advantageous. This rotation, which is caused by the specific configuration of popping vessel 80 in coaction with the air flow, tends to ensure that any unpopped kernels 4 will be kept circulating in the popping area adjacent grill 86 and will not be thrown out of popping vessel 80. This rotation also thoroughly agitates kernels 4 to promote uniform heating and popping of the kernels. The popping action can become quite violent for certain hybrids of corn. Without the rearward rotation B of the corn kernels 4, such violent popping action would throw a substantial number of unpopped kernels 4 out of vessel 80. However, the circular rotation B minimizes this problem by tending to keep most unpopped kernels 4 in vessel 80 although a few such kernels might nonetheless escape.

Corn popper 2 can be easily cleaned after use in popping a batch of corn 4. The first step in such cleaning is the removal of upper cover 14. Once the upper cover 14 is removed, popping vessel 80 simply lifts up out of the popping section 12. Thus, both the popping vessel 80 and the cover 14 which contains butter container 76 can be easily detached from body 8 and washed. If desired, chute 50 could also be detachable from body 8 for the same reasons.

Referring now to FIGS. 7-10, a second embodiment of an improved corn popper according to this invention is generally indicated as 102. Corn popper 102 has the same basic structure and operates on the same basic principles as corn popper 2. However, certain components of corn popper 102 are different from corresponding components in popper 2. For those components of corn popper 102 which are essentially the same as components in corn popper 2, those components will bear the same reference numerals as used for the corresponding components in corn popper 2 with a 100 prefix.

Corn popper 102 comprises a body 108. Body 108 comprises a generally fixed lower body portion 110 and a removable transparent upper lid or cover 114. Cover 114 is merely press fit onto the top of lower body portion 110 and has an annular flange 115 around at least a portion of its periphery which abuts a lip 111 on lower body portion 110. Lower body portion 110 includes a blower 130 and a heater 144 which are essentially identical to the blower 30 and heater 40 of corn popper 2.

The primary difference between corn popper 102 and popper 2 is the configuration of cover 114 and the addition of a special phenolic insulating sleeve 200 around the lower end 184 of popping vessel 180. Insulating sleeve 200, which is shown in FIG. 9, defines a circular socket or opening 202 in which the lower end 184 of popping vessel 180 is releasably contained. Lower end 184 carries a perforated screen 186 which is generally identical to screen 86. Insulating sleeve 200 extends for a short distance down along the sides of the heater 144 in a manner similar to sleeve 47. In addition, insulating sleeve 200 has an upwardly extending ramp portion 203 which forms the lower portion of the inclined plane 157 against which popping vessel 180 rests. Inclined plane 157 forms a gravity flow feed hopper 156 in the same manner as hopper 56.

While most of the body 108 of corn popper 102 can be made of any suitable plastic materials which are desired, many of these plastics will be able to withstand temperatures of up to only approximately 200° F. However, insulating sleeve 200 is made of a plastic which can withstand temperatures in the range of the temperatures experienced in the popping area, i.e. 450°–475° F. Thus the entire body 108 of popper 102 need not be constructed of materials present in insulating sleeve 200. These materials are more difficult to form or machine than the other types of plastics suited for use in body 108. This decreases the expense of manufacturing corn popper 102.

Popping vessel 180 is releasably contained in the body 108. In this regard, the upper edge 182 of the popping vessel 180 is abutted by various annular or arcuate surfaces 205 at the upper edge of the lower body section 110. An inwardly protruding tab 204 on one of the surfaces 205 extends through an opening in the front wall of popping vessel 180. Tab 204 helps lock the popping vessel 180 in place in the lower body portion 110. However, the popping vessel 180 is formed of sufficiently thin material, i.e. thin stainless steel, such that the popping vessel 180 can be deformed to clear the tab 204 when it is desired to remove the popping vessel 180 from the lower body portion 110.

The upper cover 114 has a substantially rectangular body portion 206 which forms a popped corn receiving chamber. The butter container 176 is integrally formed in the top of rectangular body portion 206 and has a configuration similar to container 76. A downwardly extending spout 208 is formed as part of cover 114 immediately adjacent the butter container 176. Spout 208 overlies the butter chute 150 and has two downwardly depending sides 209. Spout 208 is releasably coupled to chute 50 simply by a press fit over chute 150 with the sides 209 being located on a lip 153 adjacent the upwardly extending flanges 152 thereof. (FIG. 8) In addition, the rear portion of the cover 114 is defined by a rectangular compartment 210. Rectangular compartment 210 has the access opening 168 provided therein by which the gravity flow feed hopper 156 is filled. Cover 114 does not have a curved deflector member similar to deflector member 72. However, the popped corn 6 will still nonetheless be directed outwardly of body portion 206 by the force of the upwardly directed air flow.

One feature of corn popper 102 not shown or described with regard to corn popper 2 (but which could be used with corn popper 2) is the use of an aluminum liner indicated generally as 212. Aluminum liner 212 has a planar surface 214 and two upwardly extending side flanges 216. The shape of liner 212 conforms to the shape of the butter chute 150. In addition, liner 212 has two rearwardly extending U-shaped lips 218. Lips 218 clip around a portion of the upper lip of the butter chute 150 to releasably couple the liner 212 thereto. Liner 212 underlies butter container 176 and will receive the melted butter therefrom. Since the butter chute 150 is not removable from body 108, the use of a removable liner 212 allows the butter drippings to fall only onto the liner as the popped kernels 106 roll down chute 150 and the superimposed liner 212. To clean corn popper 102, a procedure generally similar to that used in corn popper 2 is followed. Cover 114 is removed as well as the removable popping vessel 180. In addition, the aluminum liner 212 is easily removable from chute 150 for the purpose of cleaning by virtue of the lips 218. Thus, liner 212 eases the task of cleaning popper 102 when chute 150 is not detachable.

Corn popper 102 operates similarly in all respects to corn popper 2. The gravity flow feed hopper 156 allows corn kernels 104 to go through an inlet opening 190 in popping vessel 180 to be contained thereon on the perforated screen or grill 186. As hot air passes upwardly through sleeve 200 and vessel 180, the kernels 104 will be popped and be thrown out past the top edge 182 of the popping vessel 180. Kernels 106 then roll down the butter chute 150 having the superimposed liner 212. A rearward circular rotating motion identical to motion B will be induced in the popping area since the popping vessel 180 is shaped similarly to the popping vessel 80.

Various modifications will be apparent to those skilled in the art. For example, access opening 68 to hopper 56 need not necessarily be located in cover 14 although this is preferred, but could be located elsewhere in body 8. The components of poppers 2 and 102 are preferably made of plastic, but could be made of any other suitable materials. Thus, the scope of the present invention is to be limited only by the appended claims.

What is claimed is:

1. Apparatus for popping kernels of corn, which comprises:
   (a) a body;
   (b) means located in the body for producing an upwardly directed flow of hot air;
   (c) a hollow popping vessel located in the body in the path of the hot air flow, the popping vessel having an open upper end and a lower end which is closed by a perforated grill, the perforations of the grill being smaller than the size of unpopped corn kernels, and wherein the popping vessel has an inlet opening adjacent the grill; and
   (d) means for automatically feeding unpopped corn kernels onto the grill of the popping vessel, wherein the feeding means comprises a gravity flow feed hopper operatively associated with the inlet opening of the popping vessel, the inlet opening having an upper edge which maintains a substantially constant depth of unpopped corn kernels on the grill, whereby the hot air flow passing upwardly through the grill and popping vessel will pop the unpopped corn kernels and carry the popped corn kernels out of the popping vessel over the upper edge therof.

2. A corn popping apparatus as recited in claim 1, whereby the body further includes means for directing the popped corn kernels out of the body, whereby the popped corn kernels fall into a receiver located adjacent the body.

3. A corn popping apparatus as recited in claim 2, wherein the directing means comprises a cover having a popped corn receiving chamber and an outlet opening, and further including an inclined outlet chute located on the body adjacent the outlet opening of the cover, and wherein the popped corn receiving chamber is configured to direct the popped corn kernels through the outlet opening and onto the inclined chute for passage outside the body.

4. A corn popping apparatus as recited in claim 3, further including means for dripping a melted coating agent onto the outlet chute as the popped corn passes thereover.

5. A corn popping apparatus as recited in claim 4, in which the coating agent dripping means comprises a coating agent receiving chamber located in a portion of the cover which is warmed by the upwardly directed air flow, the coating agent receiving chamber being spaced above the outlet chute and having a plurality of holes in the bottom thereof, whereby the hot air flow serves to melt the coating agent contained in the receiving chamber which melted agent drips through the holes down onto the chute.

6. A corn popping apparatus as recited in claim 4, wherein the coating agent comprises butter or a butter substitute.

7. A corn popping apparatus as recited in claim 1, in which the popping vessel is made of a metallic material and is removable from the body to allow cleaning thereof.

8. A corn popping apparatus as recited in claim 7, in which the body comprises a lower body member having a cover removably attached to a top end thereof, the popping vessel being normally held in a popping position in the lower body member and being substantially encased by the cover, whereby the popping vessel can be manually removed from the lower body member after the cover is first removed.

9. A corn popping apparatus as recited in claim 8, further including means for releasably fixing the popping vessel in its popping position in the lower body member.

10. A corn popping vessel as recited in claim 9, wherein the fixing means comprises a tab on the lower body member which releasably engages an opening in the popping vessel, the popping vessel being sufficiently deformable such that it may be disengaged from the tab to allow manual removal of the popping vessel.

11. A corn popping apparatus as recited in claim 7, wherein the lower end of the popping vessel is releasably received in an insulating sleeve in the lower body portion, the insulating sleeve being capable of withstanding the temperatures created by the upwardly directed hot air flow at the grill of the popping vessel.

12. A corn popping apparatus as recited in claim 1, wherein the popping vessel further includes means for agitating the unpopped corn kernels in a rotating circular motion.

13. A corn popping apparatus as recited in claim 12, in which the agitating means comprises a popping vessel having a front wall which is slanted rearwardly towards a rear wall thereof, the slanted front wall of the popping vessel cooperating with the upwardly directed air flow to induce the rotating circular motion of the unpopped corn kernels.

14. A hot air corn popper, which comprises:
 (a) a popping body which comprises a lower body portion having an open upper end which is closed by a removable lid;
 (b) means for producing an upwardly directed flow of hot air in the lower body portion, the hot air flow being of a sufficient temperature to pop unpopped corn kernels;
 (c) a gravity flow feed hopper located in the lower body portion for automatically feeding unpopped corn kernels into a popping area, the gravity flow feed hopper comprising an arcuate chamber defined in the lower body portion between two spaced and opposed vertical walls which terminate in front support edges, the gravity flow feed hopper further having a front wall defined by one side of a popping vessel which is releasably supported in the lower body portion against the support edges of the vertical walls; and
 (d) wherein the popping vessel is hollow and has an open upper end and a lower end closed by a perforated screen, the popping vessel having an inlet opening adjacent the grill on the one side of the popping vessel which defines the front wall of the gravity flow feed hopper, whereby the gravity flow feed hopper automatically feeds unpopped corn kernels through the inlet opening and onto the perforated screen, and wherein the hollow popping vessel is located in the path of the hot air flow such that air passing upwardly therethrough will pop the unpopped corn kernels and carry the popped corn over the top edge of the popping vessel and into the lid of the popping vessel; and
 (e) wherein the popping body lid further includes means for directing the popped corn out of the body through a discharge opening therein, the lid having an access opening which communicates with the gravity flow feed hopper when the lid is coupled to the lower body portion for the purpose of filling the feed hopper with unpopped corn kernels.

15. A hot air corn popper as recited in claim 14, in which the lower body portion further includes an outwardly extending inclined chute located beneath the lid and cooperating with the discharge opening of the lid, the lid further including means for dispensing a melted coating agent onto the chute for coating the popped corn as it proceeds down the chute.

16. A hot air corn popper as recited in claim 15, in which the chute is covered by a removable aluminum liner during operation of the coating agent dispensing means, whereby the aluminum liner may be detached from the chute for the purposes of cleaning the liner.

17. A corn popping apparatus, which comprises:
 (a) a body;
 (b) means located in the body for producing an upwardly directed flow of hot air;
 (c) a hollow popping vessel located in the body in the path of the hot air flow, the popping vessel having an open upper end and a lower end which is closed by a perforated grill, the perforations of the grill being smaller than the size of unpopped corn kernels such that the grill supports unpopped corn kernels in the path of the hot air flow, whereby the unpopped corn kernels are popped and carried upwardly by the hot air flow through the popping vessel, the popping vessel further having a front wall which is slanted rearwardly toward a rear wall of the popping vessel, the slanted front wall of the popping vessel coacting with the hot air flow to induce a circular rotating motion in the unpopped corn kernels, and (d) means for feeding unpopped corn kernels onto the grill of the popping vessel.

18. A corn popping apparatus, which comprises:
(a) a popping body which comprises a lower body portion having an open upper end which is closed by a removable lid, the lower body portion further having an outwardly extending chute;
(b) means located in the body for producing an upwardly directed flow of hot air;
(c) a hollow popping vessel located in the body in the path of the hot air flow, the popping vessel having an open upper end and a lower end which is closed by a perforated grill, the perforations of the grill being smaller than the size of unpopped corn kernels such that the grill supports unpopped corn kernels in the path of the hot air flow, whereby the unpopped corn kernels are popped and carried upwardly by the hot air flow through the popping vessel and into the lid; and
(d) wherein the popping body lid further includes means for directing the popped corn out of the body through a discharge opening therein and down into the chute, the lid further having a container for receiving a coating agent, the container having a plurality of drain holes and being located in the upward path of the hot air flow such that the container is warmed by the hot air flow, the hot air flow serving to melt the coating agent located in the container which coating agent drips through the drain holes down onto the chute for the purpose of covering the popped corn kernels with the coating agent as they pass through the chute.

19. A corn popping apparatus as recited in claim 18, wherein the coating agent chamber comprises an upwardly facing recess, and wherein the drain holes are located in the lowermost portion of the recess above the chute.

20. A corn popping apparatus as recited in claim 18, wherein the coating agent comprises butter or a butter substitute.

* * * * *

UNITED STATES PATENT AND TRADEMARK OFFICE
CERTIFICATE OF CORRECTION

PATENT NO. : 4,152,974

DATED : May 8, 1979

INVENTOR(S) : Lawrence J. Tienor

It is certified that error appears in the above-identified patent and that said Letters Patent are hereby corrected as shown below:

```
In column 6, line 23, for "supply kernels" read
                      --supply of kernels--.
             line 30, for "ping kernels 4." read
                      --ping of kernels 4.--
```

Signed and Sealed this

Fourteenth Day of August 1979

[SEAL]

Attest:

Attesting Officer

LUTRELLE F. PARKER
Acting Commissioner of Patents and Trademarks